United States Patent
Varga et al.

[19]

[11] Patent Number: 5,943,295
[45] Date of Patent: Aug. 24, 1999

[54] METHOD FOR IDENTIFYING THE PRESENCE AND ORIENTATION OF AN OBJECT IN A VEHICLE

[75] Inventors: Andrew J. Varga, Farmington Hills, Mich.; David S. Breed, Boonton Township, Morris County, N.J.; Wilbur E. DuVall, Kimberling City, Mo.

[73] Assignee: Automotive Technologies International Inc., Denville, N.J.

[21] Appl. No.: 08/919,823

[22] Filed: Aug. 28, 1997

Related U.S. Application Data

[63] Continuation-in-part of application No. 08/798,029, Feb. 6, 1997, abandoned.

[51] Int. Cl.⁶ .......................... G01S 15/06; G01S 15/88; B60R 21/32
[52] U.S. Cl. ............................. 367/99; 367/96; 280/735
[58] Field of Search ........................ 367/99, 96; 280/735

[56] References Cited

U.S. PATENT DOCUMENTS

| | | | |
|---|---|---|---|
| 4,881,270 | 11/1989 | Knecht et al. | 382/17 |
| 4,906,940 | 3/1990 | Greene et al. | 382/16 |
| 5,008,946 | 4/1991 | Ando | 382/2 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,181,254 | 1/1993 | Schweizer et al. | 382/1 |
| 5,214,744 | 5/1993 | Schweizer et al. | 395/21 |
| 5,235,339 | 8/1993 | Morrison et al. | 342/159 |
| 5,298,732 | 3/1994 | Chen | 250/203.4 |
| 5,305,012 | 4/1994 | Faris | 345/7 |
| 5,390,136 | 2/1995 | Wang | 364/754 |
| 5,413,378 | 5/1995 | Steffens, Jr. et al. | 280/735 |
| 5,482,314 | 1/1996 | Corrado et al. | 280/735 |
| 5,653,462 | 8/1997 | Breed et al. | 280/735 |
| 5,702,123 | 12/1997 | Takahashi et al. | 280/735 |

FOREIGN PATENT DOCUMENTS

| | | | |
|---|---|---|---|
| 3-42337 | 2/1991 | Japan | 180/273 |
| 005413378 | 5/1995 | U.S. | |
| 005482314 | 1/1996 | U.S. | |

OTHER PUBLICATIONS

"Analysis of Hidden Units in a Layered Network Trained to Classify Sonar Targets", R. Paul Gorman, et al., Neural Networks, vol. 1, pp. 75–89, 1988.

Learned Classification of Sonar Targets Using a Massively Parallel Network, R. Paul Gorman et al., IEEE Transactions on Acoustics, Speech and Signal Processing, vol. 36, No. 7, Jul. 7, 1988, pp. 1135–1140.

"How Airbags Work", David S. Breed, Presented at the Canadian Association of Road Safety Professionals, Oct. 19, 1992–Oct. 20, 1992.

*Primary Examiner*—Daniel T. Pihulic

[57] ABSTRACT

A method for determining the location of an object in a passenger compartment of a vehicle in which ultrasonic waves are transmitted from a first transducer into the passenger compartment, waves reflected off an object in the passenger compartment are received by the first transducer and a first distance from the first transducer to the object is calculated based on the time difference between the transmitted waves and reflected waves when received by the first transducer. Further, different ultrasonic waves are transmitted from a second transducer into the passenger compartment which then receives reflected waves off the object and a second distance from the second transducer to the object is calculated based on the time difference between the transmitted waves and reflected waves when received by the second transducer. The approximate location of the object in the passenger compartment is determined based on the first distance and the second distance.

28 Claims, 9 Drawing Sheets

METHOD FOR IDENTIFYING THE PRESENCE AND ORIENTATION OF AN OBJECT IN A VEHICLE

CROSS REFERENCE TO RELATED APPLICATIONS

This application is a continuation-in-part of U.S. patent application Ser. No. 08/798,029 filed Feb. 6, 1997 now abandoned.

This application is related to: (i) U.S. patent application Ser. No. 08/505,036 now U.S. Pat. No. 5,653,462, entitled "Vehicle Occupant Position And Velocity Sensor" filed Jul. 21, 1995, which is a continuation of U.S. patent application Ser. No. 08/040,978 now abandoned, filed Mar. 31, 1993, which in turn is a continuation of U.S. patent application Ser. No. 07/878,571 now abandoned, filed May 5, 1992; (ii) U.S. patent application Ser. No. 08/239,978 now abandoned, entitled "Vehicle Interior Identification and Monitoring System" filed May 9, 1994; (iii) U.S. patent application Ser. No. 08/474,786 now U.S. Pat. No. 5,845,000, entitled "Optical Identification and Monitoring System Using Pattern Recognition for use with Vehicles" filed Jun. 7, 1995; (iv) U.S. patent application Ser. No. 08/474,783 now U.S. Pat. No. 5,822,707, entitled "Automatic Vehicle Seat Adjuster" filed Jun. 7, 1995; (v) U.S. patent application Ser. No. 08/474,784 now U.S. Pat. No. 5,748,473, entitled "Automatic Vehicle Seat Adjuster" filed Jun. 7, 1995; and, (vi) U.S. patent application Ser. No. 08/474,782 now U.S. Pat. No. 5,835,613, entitled "Optical Identification and Monitoring System Using Pattern Recognition for use with Vehicles" filed Jun. 7, 1995, which are all incorporated by reference herein.

FIELD OF THE INVENTION

The present invention relates to the field of sensing, detecting, monitoring and identifying various objects, and parts thereof, which are located within the passenger compartment of a motor vehicle. In particular, by means of the present invention, an efficient and highly reliable method for detecting a rear facing child seat (RFCS) situated in the passenger compartment in a location where it may interact with a deploying airbag or for detecting an out-of-position occupant is attained permitting the selective suppression of airbag deployment when the deployment may result in greater injury to the occupant than the crash forces themselves. This is accomplished in part through a method of placement of transducers and novel analysis of the signals from the transducers.

BACKGROUND OF THE INVENTION

1. Prior Art on out-of-position occupants and rear facing child seats

Whereas thousands of lives have been saved by airbags, a large number of people have also been injured, some seriously, by the deploying airbag, and thus significant improvements need to be made in this regard. As discussed in detail in one or more of the copending patent applications cross-referenced above, for a variety of reasons vehicle occupants may be too close to the airbag before it deploys and can be seriously injured or killed as a result of the deployment thereof. Also, a child in a rear facing child seat which is placed on the right front passenger seat is in danger of being seriously injured if the passenger airbag deploys. For these reasons and, as first publicly disclosed in Breed, D. S. "How Airbags Work" presented at the International Conference on Seatbelts and Airbags in 1993, in Canada, occupant position sensing and rear facing child seat detection is required in order to minimize the damages caused by deploying airbags.

Initially these systems will solve the out-of-position occupant and the rear facing child seat problems related to current airbag systems and prevent unneeded and unwanted airbag deployments when a front seat is unoccupied. However, airbags are now under development to protect rear seat occupants in vehicle crashes and all occupants in side impacts. A system will therefore be needed to detect the presence of occupants, determine if they are out-of-position and to identify the presence of a rear facing child seat in the rear seat. Future automobiles are expected to have eight or more airbags as protection is sought for rear seat occupants and from side impacts. In addition to eliminating the disturbance and possible harm of unnecessary airbag deployments, the cost of replacing these airbags will be excessive if they all deploy in an accident needlessly.

Inflators now exist which will adjust the amount of gas flowing to the airbag to account for the size and position of the occupant and for the severity of the accident, e.g., based on the rate of flow of the inflating gas. The vehicle identification and monitoring system (VIMS) discussed in co-pending application Ser. No. 08/239,978, now abandoned, among others, will control such inflators based on the presence and position of vehicle occupants or of a rear facing child seat. The instant invention is an improvement on that VIMS system and uses an advanced ultrasonic system comprising two or more ultrasonic transmitters/receivers combined with a trained neural network pattern recognition system as discussed in much greater detail below.

The automatic adjustment of the deployment rate of the airbag based on occupant identification and position and on crash severity has been termed "smart airbags". Central to the development of smart airbags is the occupant identification and position system described herein. To complete the development, an anticipatory crash detecting system such as disclosed in U.S. patent application Ser. No. 08/247,760 now abandoned, filed May 23, 1994 is desirable. Prior to the implementation of anticipatory crash sensing, the use of a neural network smart crash sensor which identifies the type of crash and thus its severity based on the early part of the crash acceleration signature should be developed and thereafter implemented. U.S. patent application Ser. No. 08/476,076 now U.S. Pat. No. 5,684,701, filed Jun. 7, 1995 describes a crash sensor based on neural networks. This crash sensor, as with all other crash sensors, determines whether or not the crash is of sufficient severity to require deployment of the airbag and, if so, initiates the deployment. A neural network based on a smart airbag crash sensor could also be designed to identify the crash and categorize it with regard to severity thus permitting the airbag deployment to be matched not only to the characteristics and position of the occupant but also the severity and timing of the crash itself The need for an occupant out-of-position sensor has also been observed by others and several methods have been disclosed in certain U.S. patents for determining the position of an occupant of a motor vehicle. Each of these systems will be discussed below and unfortunately have significant limitations.

In White et al. (U.S. Pat. No. 5,071,160), for example, a single acoustic sensor and detector is described and, as illustrated, is mounted lower than the steering wheel. White et al. correctly perceive that such a sensor could be defeated, and the airbag falsely deployed, by an occupant adjusting the control knobs on the radio and thus they suggest the use of a plurality of such sensors but do not disclose where they would be mounted, other than on the instrument panel below the steering wheel, or how they would be combined to uniquely monitor particular locations in the passenger compartment and to identify what is occupying those locations.

Mattes et al. (U.S. Pat. No. 5,118,134) describe a variety of methods of measuring the change in position of an occupant including ultrasonic, active or passive infrared and microwave radar sensors, and an electric eye. Their use of these sensors is to measure the change in position of an occupant during a crash and use that information to assess the severity of the crash and thereby decide whether or not to deploy the airbag. They are thus using the occupant motion as a crash sensor. No mention is made of determining the out-of-position status of the occupant or of any of the other features of occupant monitoring as disclosed in the above cross-referenced patent applications. It is interesting to note that nowhere does Mattes et al. discuss how to use a combination of ultrasonic sensors/transmitters to identify the presence of a human occupant and then to find his/her location in the passenger compartment.

The object of an occupant out-of-position sensor is to determine the location of the head and/or chest of the vehicle occupant relative to the airbag since it is the impact of either the head or chest with the deploying airbag which can result in serious injuries. Both White et al. and Mattes et al. disclose only lower mounting locations of their sensors which are mounted in front of the occupant such as on the dashboard or below the steering wheel. Both such mounting locations are particularly prone to detection errors due to positioning of the occupant's hands, arms and legs. This would require at least three, and preferably more, such sensors and detectors and an appropriate logic circuitry which ignores readings from some sensors if such readings are inconsistent with others, for the case, for example, where the driver's arms are the closest objects to two of the sensors.

White et al. also describe the use of error correction circuitry, without defining or illustrating the circuitry, to differentiate between the velocity of one of the occupant's hands, as in the case where he/she is adjusting the knob on the radio, and the remainder of the occupant. Three ultrasonic sensors of the type disclosed by White et al. might, in some cases, accomplish this differentiation if two of them indicated that the occupant was not moving while the third was indicating that he or she was moving. Such a combination, however, would not differentiate between an occupant with both hands and arms in the path of the ultrasonic transmitter at such a location that they were blocking a substantial view of the occupant's head or chest. Since the sizes and driving positions of occupants are extremely varied, trained pattern recognition systems, such as neural networks, are required when a clear view of the occupant, unimpeded by his/her extremities, cannot be guaranteed. White et al. do not suggest the use of such neural networks.

Fujita et al., in U.S. Pat. No. 5,074,583, describe another method of determining the position of the occupant but do not use this information to suppress deployment if the occupant is out-of-position, or if a rear facing child seat is present. In fact, the closer that the occupant gets to the airbag the faster the inflation rate of the airbag is according to the Fujita patent, which thereby increases the possibility of injuring the occupant. Fujita et al. do not measure the occupant directly but instead determine his or her position indirectly from measurements of the seat position and the vertical size of the occupant relative to the seat. This occupant height is determined using an ultrasonic displacement sensor mounted directly above the occupant's head.

It is important to note that in all cases in the prior art, except those assigned to the current assignee of the instant invention, where ultrasonic sensors are used to determine displacement, only the initial return of reflected waves is used so that only the distance to the closest part of the object can be determined. In contrast, in the instant invention, the return echo pattern over several milliseconds corresponding to the entire portion of the passenger compartment volume of interest is analyzed providing distance information to many points on the items occupying the passenger compartment.

2. Definitions

The use of pattern recognition is central to the instant invention as well as those cross-referenced patent applications above. Nowhere in the prior art, except in that assigned to the current assignee of the instant invention, is pattern recognition which is based on training, as exemplified through the use of neural networks, mentioned for use in monitoring the interior passenger compartment or exterior environments of the vehicle.

"Pattern recognition" as used herein will mean any system which processes a signal that is generated by an object, e.g., representative of a pattern of returned or received impulses, waves or other physical property specific to and/or characteristic of and/or representative of that object, or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers which are sensitive to acoustic (ultrasonic) radiation.

A trainable or a trained pattern recognition system as used herein means a pattern recognition system which is taught to recognize various patterns constituted within the signals by subjecting the system to a variety of examples. The most successful such system is the neural network. Thus, to generate the pattern recognition algorithm, test data is first obtained which constitutes a plurality of sets of returned waves, or wave patterns, from an object and an indication of the identify of that object, i.e., a number of different objects are tested to obtain the unique wave patterns from each object. As such, the algorithm is generated, and stored in a computer processor, and which can later be applied to provide the identity of an object based on the wave pattern being received during use by a receiver connected to the processor. For the purposes, the identity of an object sometimes applies to not only the object itself but also to its location in the passenger compartment. For example, a rear facing child seat is a different object than a forward facing child seat and an out-of-position adult is a different object than a normally seated adult.

To "identify" as used herein will mean to determine that the object belongs to a particular set or class. The class may be one containing, for example, all rear facing child seats, one containing all human occupants, or all human occupants not sitting in a rear facing child seat depending on the purpose of the system. In the case where a particular person is to be recognized, the set or class will contain only a single element, i.e., the person to be recognized.

An "occupying item" of a seat may be a living occupant such as a human being or a dog, another living organism such as a plant, or an inanimate object such as a box or bag of groceries.

"Out-of-position" as used for an occupant means that the occupant, either driver or passenger, is sufficiently close to the airbag prior to deployment that he or she is likely to be more seriously injured by the deployment event itself than by the accident. This typically occurs when the occupant's head or chest is closer than some distance such as about 5 inches from the deployment door of the airbag module. The actual distance value where airbag deployment should be suppressed depends on the design of the airbag module and is typically further for the passenger airbag than for the driver airbag.

"Transducer" as used herein will in general mean the combination of a transmitter and a receiver. In come cases, the same device will serve both as the transmitter and receiver while in others two separate devices adjacent to each other will be used.

In the description herein on anticipatory sensing, the term "approaching" when used in connection with the mention of an object or vehicle approaching another will mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle which is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

3. Pattern recognition prior art

Japanese patent 3-42337 (A) to Ueno discloses a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstructs a clear view of his/her eyes. Pattern recognition technologies such as neural networks are not used.

U.S. Pat. No. 5,008,946 to Ando uses a complicated set of rules to isolate the eyes and mouth of a driver and uses this information to permit the driver to control the radio, for example, or other systems within the vehicle by moving his eyes and/or mouth. Ando uses natural light and illuminates only the head of the driver. He also makes no use of trainable pattern recognition systems such as neural networks, nor is there any attempt to identify the contents of the vehicle nor of their location relative to the vehicle passenger compartment. Rather, Ando is limited to control of vehicle devices by responding to motion of the driver's mouth and eyes.

U.S. Pat. No. 5,298,732 to Chen also concentrates in locating the eyes of the driver so as to position a light filter between a light source such as the sun or the lights of an oncoming vehicle, and the driver's eyes. Chen does not explain in detail how the eyes are located but does supply a calibration system whereby the driver can adjust the filter so that it is at the proper position relative to his or her eyes. Chen references the use of an automatic equipment for determining the location of the eyes but does not describe how this equipment works. In any event, there is no mention of monitoring the position of the occupant, other that the eyes, of determining the position of the eyes relative to the passenger compartment, or of identifying any other object in the vehicle other than the driver's eyes. Also, there is no mention of the use of a trainable pattern recognition system.

U.S. Pat. No. 5,305,012 to Faris also describes a system for reducing the glare from the headlights of an oncoming vehicle. Faris locates the eyes of the occupant by the use of two spaced apart infrared cameras using passive infrared radiation from the eyes of the driver. Again, Faris is only interested in locating the driver's eyes relative to the sun or oncoming headlights and does not identify or monitor the occupant or locate the occupant, a rear facing child seat or any other object for that matter, relative to the passenger compartment or the airbag. Also, Faris does not use trainable pattern recognition techniques such as neural networks. Faris, in fact, does not even say how the eyes of the occupant are located but refers the reader to a book entitled Robot Vision (1991) by Berthold Horn, published by MIT Press, Cambridge, Mass. Also, Faris uses the passive infrared radiation rather than illuminating the occupant with ultrasonic radiation as in the instant invention.

The use of neural networks as the pattern recognition technology is central to this invention since it makes the monitoring system robust, reliable and practical. The resulting algorithm created by the neural network program is usually only a few lines of code written in the C computer language as opposed to typically hundreds of lines when the techniques of the above patents to Ando, Chen and Faris are implemented. As a result, the resulting systems are easy to implement at a low cost making them practical for automotive applications. The cost of the ultrasonic transducers, for example, is expected to be less than about $1 in automotive quantities. Similarly, the implementation of the techniques of the above referenced patents requires expensive microprocessors while the implementation with neural networks and similar trainable pattern recognition technologies permits the use of low cost microprocessors typically costing less than about $5.

The present invention uses sophisticated trainable pattern recognition capabilities such as neural networks. Usually the data is preprocessed, as discussed below, using various feature extraction techniques. A non-automotive example of such a pattern recognition system using neural networks on sonar signals is discussed in two papers by Gorman, R. P. and Sejnowski, T. J. "Analysis of Hidden Units in a Layered Network Trained to Classify Sonar Targets", Neural Networks, Vol. 1. pp. 75–89, 1988, and "Learned Classification of Sonar Targets Using a Massively Parallel Network", IEEE Transactions on Acoustics, Speech, and Signal Processing, Vol. 36, No. 7, July 1988. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same and U.S. patent application Ser. No. 08/076, 601 entitled "Neural Network and Method of Using Same" to Wang, S. T. Other examples include U.S. Pat. Nos. 5,235,339 (Morrison et al.), 5,214,744 (Schweizer et al), 5,181,254 (Schweizer et al), and 4,881,270 (Knecht et al). All of the above references are included herein by reference.

4. Ultrasonics

Ultrasonics can be used in several configurations for monitoring the interior of a passenger compartment of an automobile as described in the cross referenced patents and patent applications. In one known system, for example, two ultrasonic sensors are placed on the A-pillar and in another system, a third sensor is additionally placed in the headliner. It has been found in both of these cases that even though the proper identification is made in a high percentage of the cases, there are still a small but significant number of cases where an error in diagnosis is made based on the information received from the sensors. These systems, although a significant improvement over the other prior art, still fail to achieve the very high reliability desired by the automobile manufacturers.

In the cases of the instant invention as will discussed in more detail below, regardless of the number of transducers used, a trained pattern recognition system, as defined above, is used to identify and classify, and in some cases to locate, the illuminated object and its constituent parts.

5. Applications

The applications for this technology are numerous as described in the copending patent applications listed above. However, the main focus of the instant invention is for the detection of the presence of a child seat in the rear facing position or an out-of-position occupant and the detection of an occupant in a normal seating position. In the former two cases, deployment of the airbag will be suppressed and in the latter, it will be enabled.

OBJECTS AND SUMMARY OF THE INVENTION

In general, it is an object of the present invention to provide an new and improved method for identifying the presence and orientation of an object in a vehicle.

It is another broad object of the present invention to provide a method for accurately detecting the presence of a rear-facing child seat in order to prevent an airbag from deploying, which airbag would impact against the rear-facing child seat if deployed.

It is yet another broad object of the present invention to provide a method for accurately detecting the presence of an out-of-position occupant in order to prevent one or more airbags from deploying, which airbag(s) would impact against the head or chest of the occupant during its initial deployment phase causing injury or possible death to the occupant.

This invention is a system to identify, locate and monitor occupants, including their parts, and other objects in the passenger compartment and in particular a child seat in the rear facing position or an out-of-position occupant, by illuminating the contents of the vehicle and objects outside of the vehicle with ultrasonic radiation, e.g., by transmitting ultrasonic radiation waves from an ultrasonic wave generating apparatus, and receiving reflected ultrasonic radiation using two or more ultrasonic transducers properly located in the vehicle passenger compartment, and in specific predetermined optimum locations. More particularly, this invention relates to a method for appropriately locating and mounting the ultrasonic transducers and for analyzing the reflected radiation, i.e., from any object to which the ultrasonic waves impact, in order to achieve an accuracy of recognition heretofore not possible. Outputs from the ultrasonic receivers, are analyzed by appropriate computational means employing trained pattern recognition technologies, to classify, identify and/or locate the contents, and/or determine the orientation of, e.g., a rear facing child seat. In general, the information obtained by the identification and monitoring system is used to affect the operation of some other system in the vehicle and particularly the passenger and/or driver airbag systems, which may include a front airbag, a side airbag, a knee bolster, or combinations of the same. However, the information obtained can be used for a multitude of other vehicle systems.

When the vehicle interior monitoring system of this invention is installed in the passenger compartment of an automotive vehicle equipped with a occupant protective device, such as an inflatable airbag, and the vehicle is subjected to a crash of sufficient severity that the crash sensor has determined that the protective device is to be deployed, the system, in accordance with the invention, has previously determined, (i.e., prior to the deployment) whether a child placed in the rear facing position in the child seat is present and if so, a signal has been sent to the control circuitry that the airbag should be disabled, that is, not deployed in the crash. The system of this invention also determines the position of the vehicle occupant relative to the airbag and disables deployment of the airbag if the occupant is positioned so that he/she is likely to be injured by the deployment of the airbag.

Principal objects and advantages of the methods in accordance with the invention are:

1. To provide a reliable method for recognizing the presence of a rear facing child seat on a particular seat of a motor vehicle and to use this information to affect the operation of another vehicle system such as the airbag system.

2. To provide a reliable method for recognizing the presence of a human on a particular seat of a motor vehicle and to use this information to affect the operation of another vehicle system such as the airbag, heating and air conditioning, or entertainment systems, among others.

3. To provide a reliable method for recognizing the presence of a human on a particular seat of a motor vehicle and then to determine his/her position and to use this position information to affect the operation of another vehicle system.

4. To provide a reliable method for determining the position, velocity or size of an occupant in a motor vehicle and to utilize this information to control the rate of gas generation, or the amount of gas generated by an airbag inflator system or other aspects of the airbag system.

5. To provide a reliable method for determining in a timely manner that an occupant is out of position, or will become out of position, and likely to be injured by a deploying airbag and to then output a signal to suppress the deployment of the airbag.

6. To provide a method for locating transducers within the passenger compartment at specific locations such that the highest reliability of classification of objects and their position is obtained from the signals generated by the transducers.

These and other objects and advantages will become apparent from the following description of the preferred embodiments of the vehicle identification and monitoring system of this invention.

BRIEF DESCRIPTION OF THE DRAWINGS

The following drawings are illustrative of embodiments of the invention and are not meant to limit the scope of the invention as encompassed by the claims. In particular, the illustrations below are limited to the monitoring of the front passenger seat for the purpose of describing the invention. Naturally, the invention applies as well to the other seating positions in the vehicle and particularly to the driver position.

DESCRIPTION OF THE PREFERRED EMBODIMENTS

Figure 1:
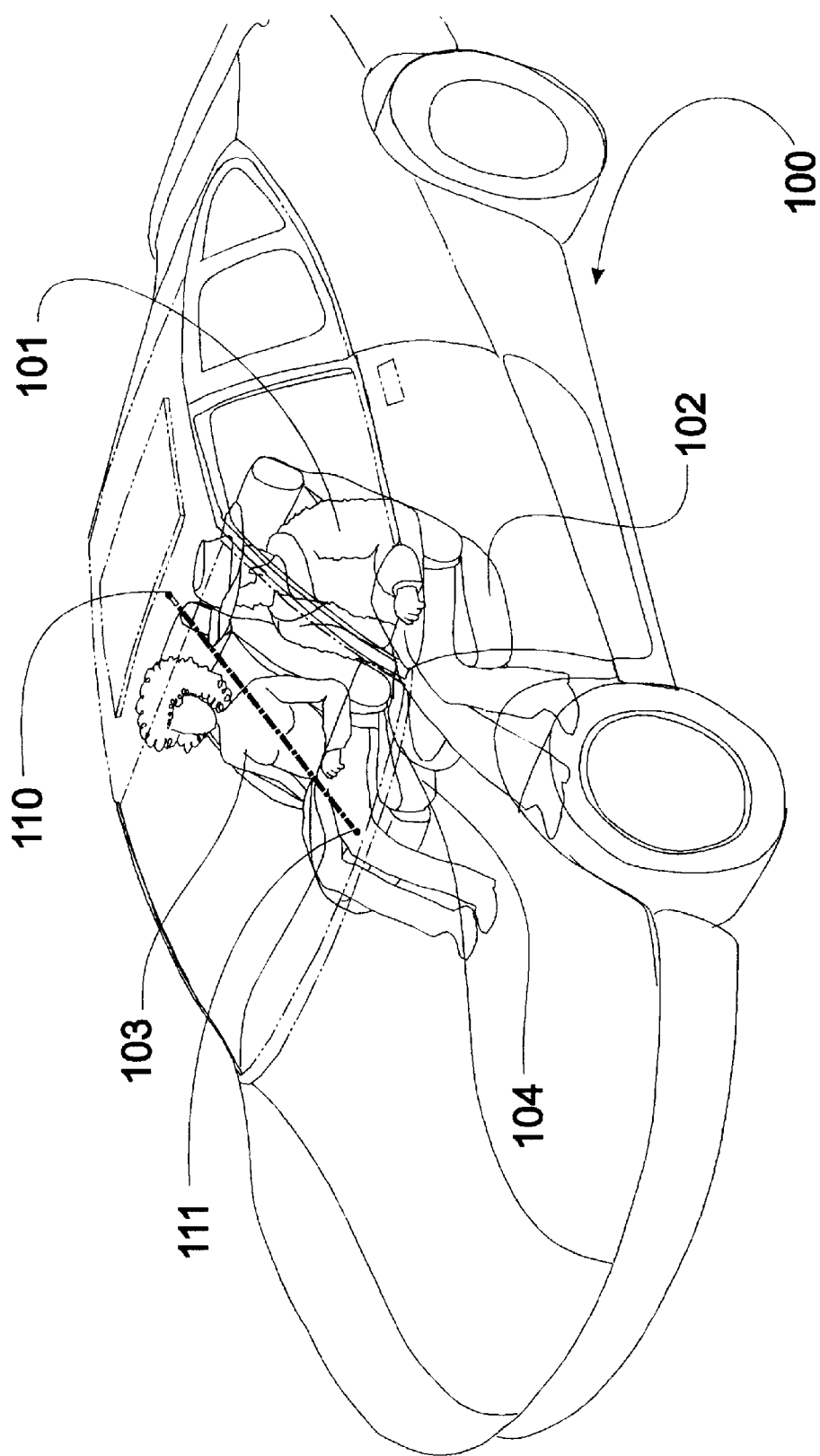
FIG. 1 is a perspective view of a vehicle containing two adult occupants on the front seat with the vehicle shown in phantom illustrating one preferred location of the ultrasonic transducers placed according to the methods taught in this invention.

Referring now to the drawings, where like reference numbers represent like or similar parts, a section of the passenger compartment of an automobile is shown generally as 100 in FIG. 1. A driver 101 of a vehicle sits on a seat 102 behind a steering wheel, not shown, and an adult passenger 103 sits on seat 104 on the passenger side. Two transmitter and receiver assemblies 110 and 111, also referred to herein as transducers, are positioned in the passenger compartment 100, one transducer 110 is arranged on the headliner adjacent or in proximity to the dome light and the other transducer 111 is arranged on the center of the top of the dashboard (the methodology leading to the placement of these transducers is central to the instant invention as explained in detail below). In this situation, the invention will reliably detect that an occupant is sitting on seat 104 and deployment of the airbag is enabled in the event that the vehicle experiences a crash. Transducers 110,111 are placed with their separation axis parallel to the separation axis of the head, shoulder and rear facing child seat volumes of occupants of an automotive passenger seat and in view of this specific positioning, are capable of distinguishing the different configurations.

Figure 2:
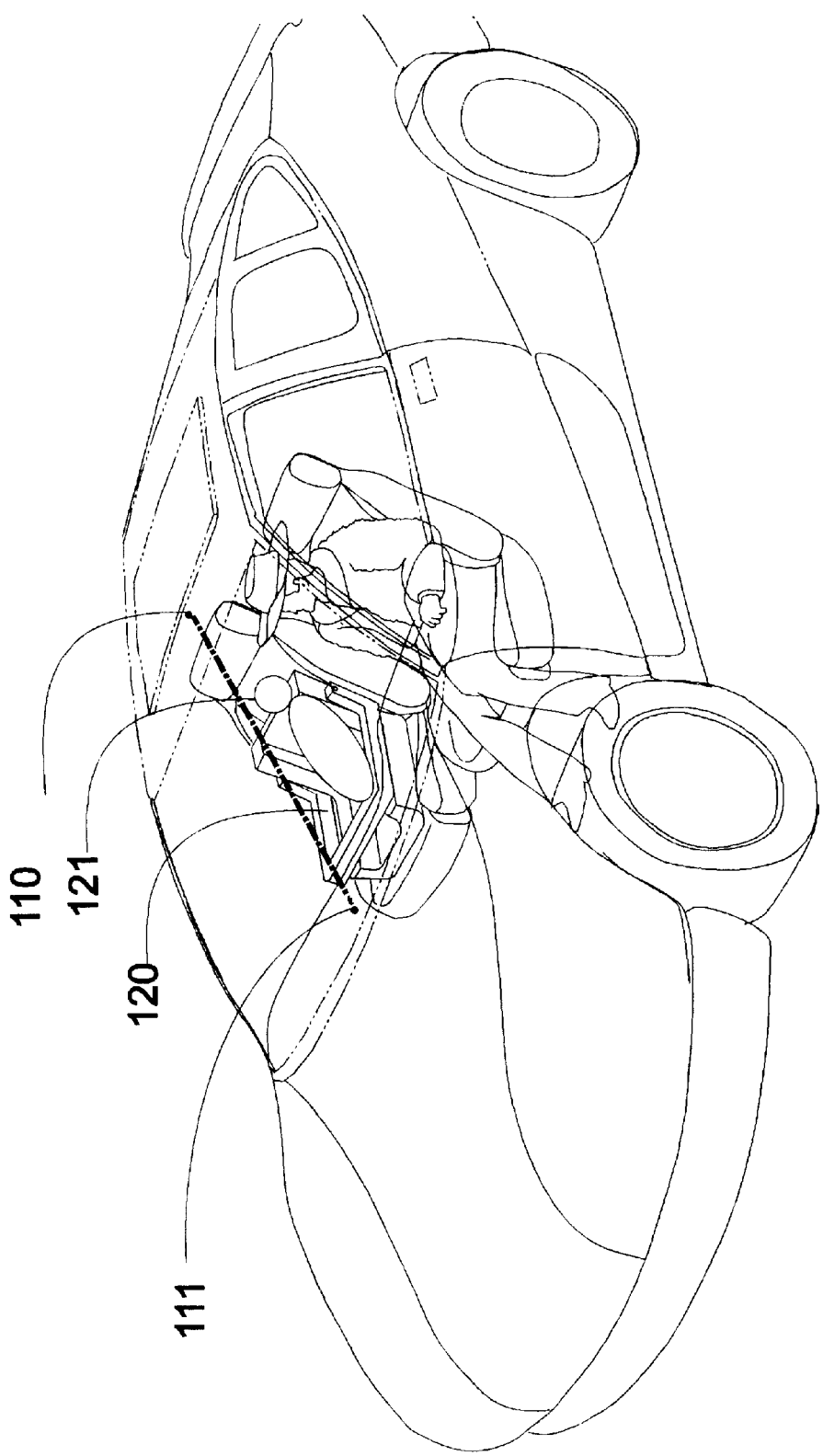
FIG. 2 is a view as in FIG. 1 with the passenger occupant replaced by a child in a forward facing child seat.
Figure 3:
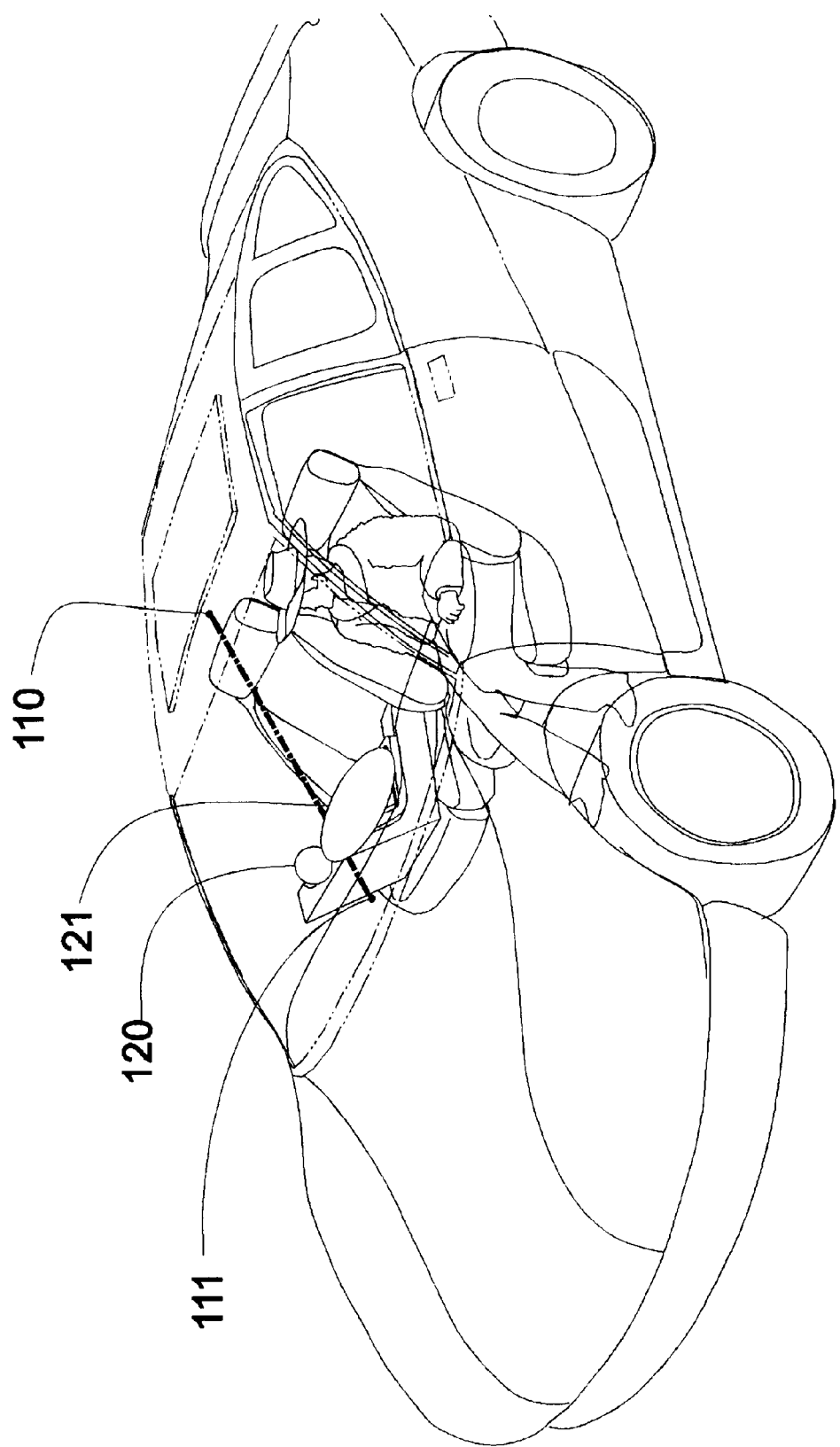
FIG. 3 is a view as in FIG. 1 with the passenger occupant replaced by a child in a rearward facing child seat.
Figure 4:
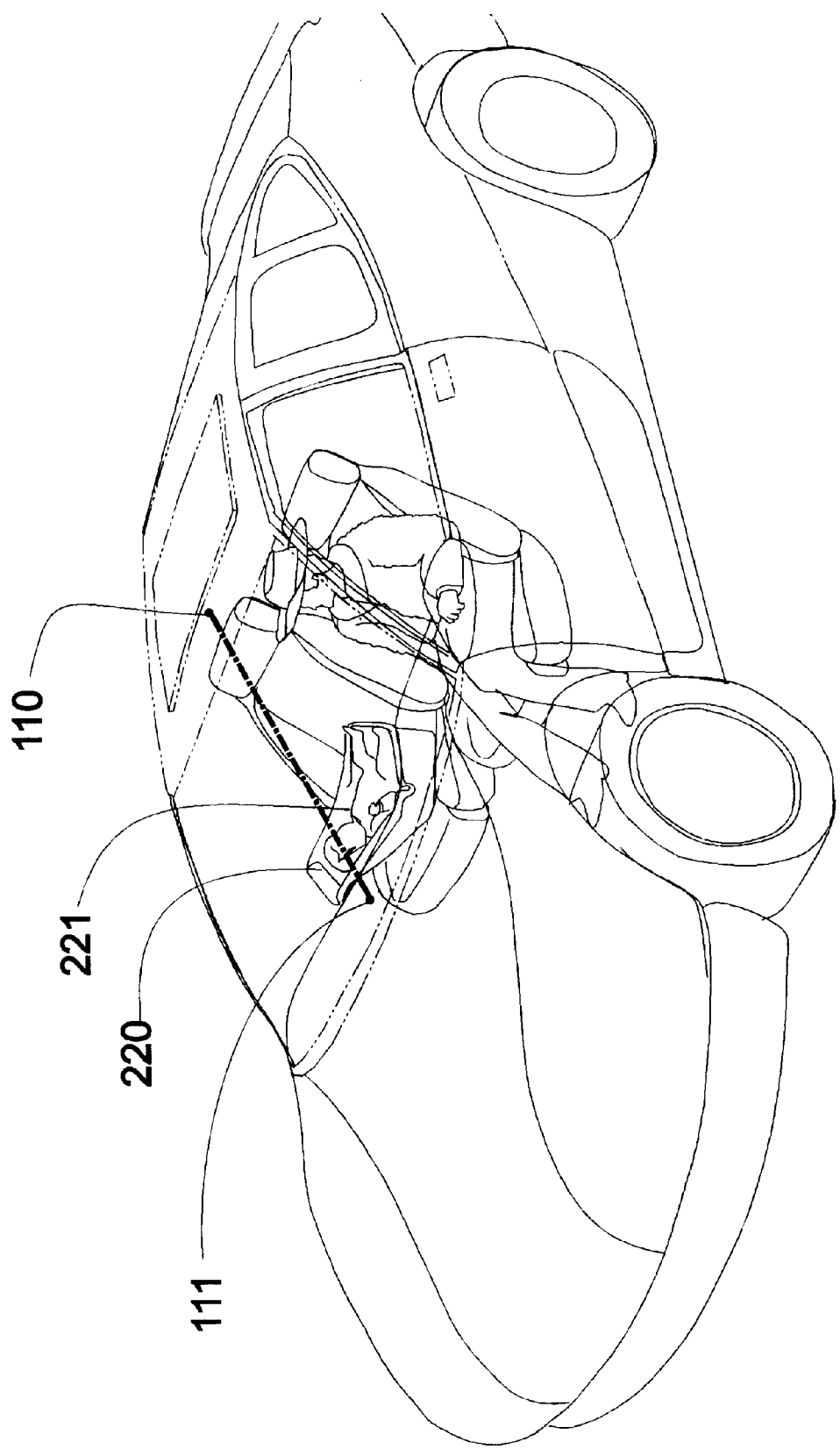
FIG. 4 is a view as in FIG. 1 with the passenger occupant replaced by an infant in an infant seat.

In FIG. 2, a forward facing child seat 120 containing a child 121 replaces the adult passenger 103 as shown in FIG. 1. In this case, it is required that the airbag not be disabled in the event of an accident. However, in the event that the same child seat is placed in the rearward facing position as shown in FIG. 3, then the airbag is required to be disabled since deployment of the airbag in a crash can seriously injure or even kill the child. Furthermore, as illustrated in FIG. 4, if an infant 131 in an infant carrier 130 is positioned in the rear facing position of the passenger seat, the airbag should be disabled for the reasons discussed above. It should be noted that the disabling or enabling of the passenger airbag relative to the item on the passenger seat may be tailored to the specific application. For example, in some embodiments, with certain forward facing child seats, it may in fact be desirable to disable the airbag. The selection of when to disable or enable the airbag, as a function of the item in the passenger seat and its location, is made during the programming or training stage of the sensor system and, in most cases, the criteria set forth above will be applicable, i.e., enabling airbag deployment for a forward facing child seat and an adult in a proper seating position and disabling airbag deployment for a rearward facing child seat and infant and for any occupant who is out-of-position and in close proximity to the airbag module. The sensor system in accordance with the invention may however be programmed according to other criteria.

Several systems have been devised to discriminate between the four cases illustrated above but none have shown a satisfactory accuracy or reliability of discrimination. Some of these systems appear to work as long as the child seat is properly placed on the seat and belted in. So called "tag systems", for example, whereby a device is placed on the child seat which is electromagnetically sensed by sensors placed within the seat have not proven reliable. They function well as long as the child seat is restrained by a seat belt but when this is not the case they have a high failure rate. Since the seatbelt usage of the population of the United States is only about 50% at the present time, it is quite likely that a significant percentage of child seats will not be properly belted into the seat and thus children will be subjected to injury and death in the event of an accident.

The methodology of this invention was devised to solve this problem. To understand this methodology, consider two ultrasonic transmitters and receivers 110 and 111 (transducers) which are connected by an axis AB in FIG. 5. Each transmitter radiates a signal which is primarily confined to a cone angle with its origin at the transmitter. For simplicity, assume that the transmitter and receiver are the same device although in some cases a separate device will be used for each function. When a transducer sends out a burst of waves, to thereby illuminate the passenger compartment with ultrasonic radiation, and then receives a reflection from some object in the passenger compartment, the distance of the object from the transducer can be determined by the time delay between the transmission of the waves and the reception of the reflected waves.

Figure 5:
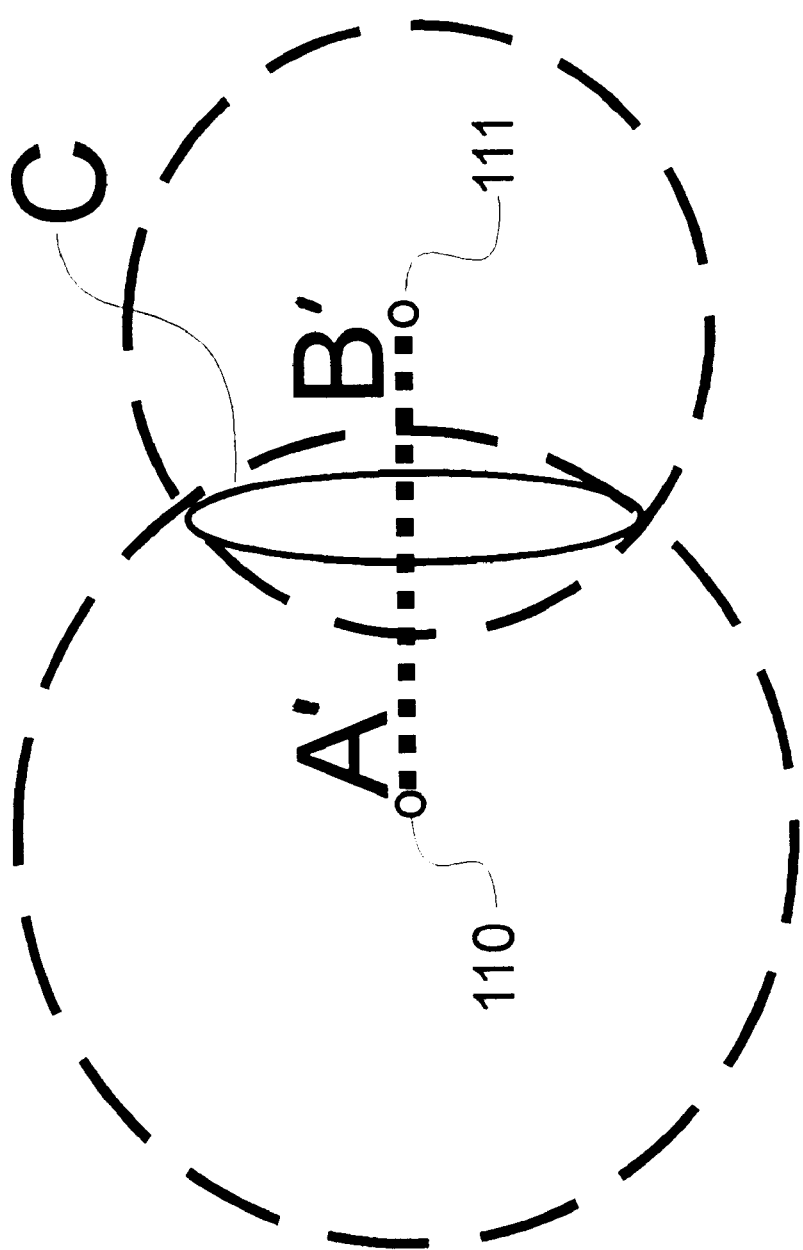
FIG. 5 is a diagram illustrating the interaction of two ultrasonic sensors and how this interaction is used to locate a circle is space.

When looking at a single transducer, it is not possible to determine the direction to the object which is reflecting the signal but it is possible to know only how far that object is from the transducer (i.e., a single transducer enables a distance measurement but not a directional measurement). In other words, the object may be at a point along a three-dimensional sphere having its origin at the transducer and a radius equal to the distance. If two transducers, such as 110 and 111 in FIG. 5, are used and both transducers receive a reflection from an object, presumably the same object which is facilitated by proper placement of the transducers, which reflection depends on the distance from the object to the respective transducer. If it is assumed for the purposes of this analysis that the two transducers act independently, that is, they only listen to the reflections of waves which they themselves transmitted, then each transducer knows the distance to the reflecting object but not its direction. If we assume that the transducer radiates ultrasound in all directions, each transducer knows that the object is located on a spherical surface A',B' a respective known distance from the transducer, i.e., each transducer knows that the object is a specific distance from that transducer which may or may not be the same distance between the other transducer and the same object. Since now there are two transducers, and the distance of the reflecting object is known relative to each of the transducers, the actual location of the object resides on a circle which is the intersection of the two spherical surfaces A',B'. This circle is labeled C in FIG. 5. At each point along circle C, the distance to the transducer 110 is the same and the distance to the transducer 111 is the same.

Figure 6:
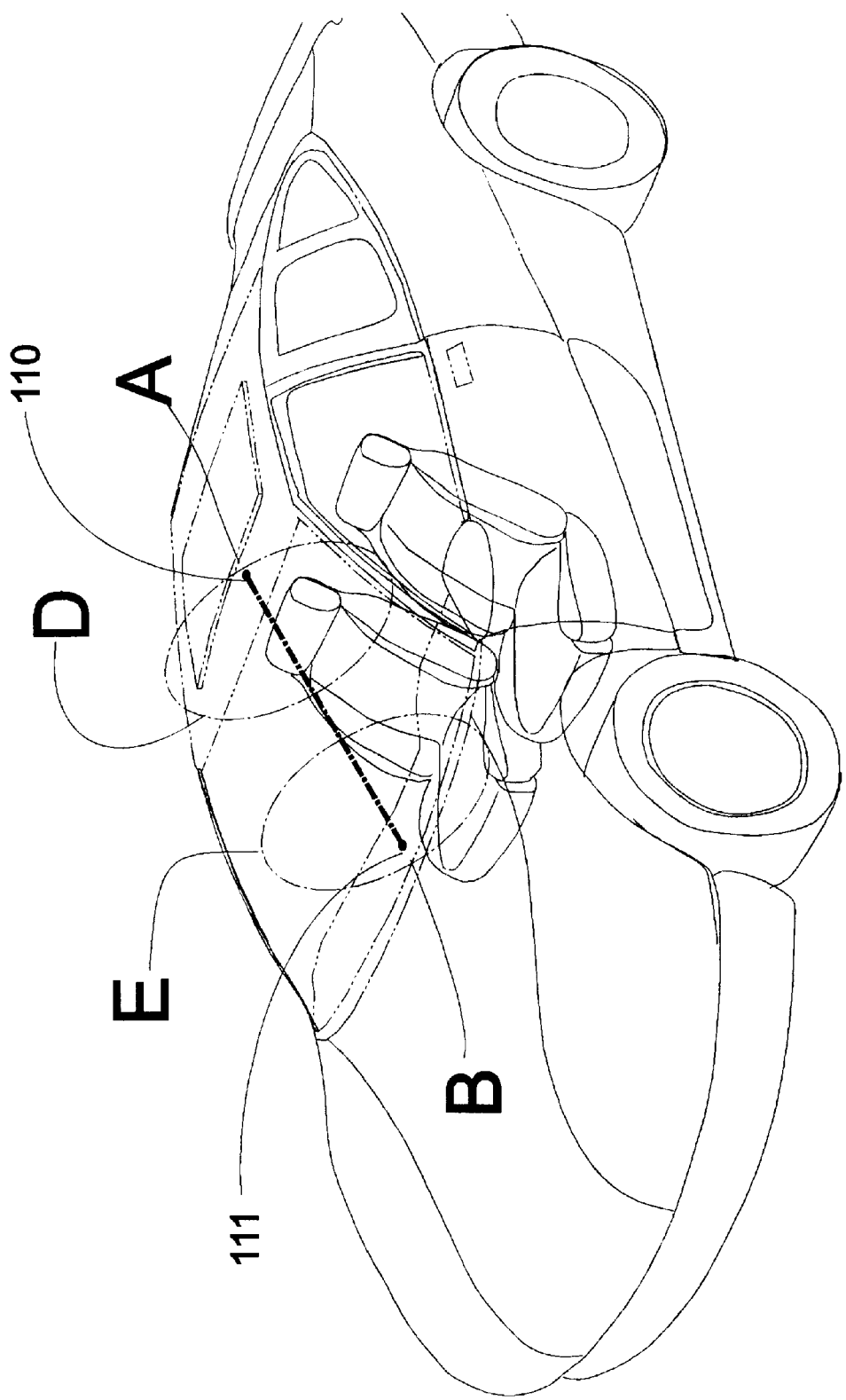
FIG. 6 is a view as in FIG. 1 with the occupants removed illustrating the location of two circles in space and how they intersect the volumes characteristic of a rear facing child seat and a larger occupant.

For many cases, the mere knowledge that the object lies on a particular circle is sufficient since it is possible to locate the circle such that the only time that an object lies on a particular circle that its location is known. That is, the circle which passes through the area of interest otherwise passes through an volume where no objects can occur. Thus, the mere calculation of the circle in this specific location, which indicates the presence of the object along that circle, provides valuable information concerning the object in the passenger compartment which may be used to control or affect another system in the vehicle such as the airbag system. FIG. 6 for example illustrates two circles D and E, of interest which represent the volume which is usually occupied when the seat is occupied by a person not in a child seat, C, or by a forward facing child seat and the volume normally occupied by a rear facing child seat, respectively. Thus, if the circle generated by the system, i.e., by appropriate processor means which receive the distance determination from each transducer and creates the circle from the intersection of the spheres which represent the distance from the transducers to the object, is at a location which is only occupied by an adult passenger, the airbag would not be disabled since its deployment in a crash is desired. On the other hand, if a circle is at a location occupied only by a rear facing child seat, the airbag would be disabled.

From the above discussion, a method of transducer location is disclosed which provides unique information to differentiate between (i) a forward facing child seat or a forward properly positioned occupant where airbag deployment is desired and (ii) a rearward facing child seat and an out-of-position occupant where airbag deployment is not desired. In actuality, the algorithm used to implement this theory does not directly calculate the surface of spheres or the circles of interaction of spheres. Instead, a pattern recognition system is used to differentiate airbag-deployment desired cases from those where the airbag should not be deployed. For the pattern recognition system to accurately perform its function, however, the patterns presented to the system must have the requisite information. That is, a pattern of reflected waves from an occupying item in a passenger compartment to various transducers must be uniquely different for cases where airbag deployment is desired from cases where deployment is not desired. The theory described above and in more detail below teaches how to locate transducers within the vehicle passenger compartment so that the patterns of reflected waves will be easily distinguishable for cases where airbag deployment is desired from those where deployment is not desired. In the case presented thus far, it has been shown that in some implementations the use of only two transducers can result in the desired pattern differentiation when the vehicle geometry is such that two transducers can be placed such that the circles D (airbag enabled) and E (airbag disabled) fall outside of the vehicle (and thus cannot be occupied) except where they are in the critical regions where positive identification of the condition occurs.

Figure 7:
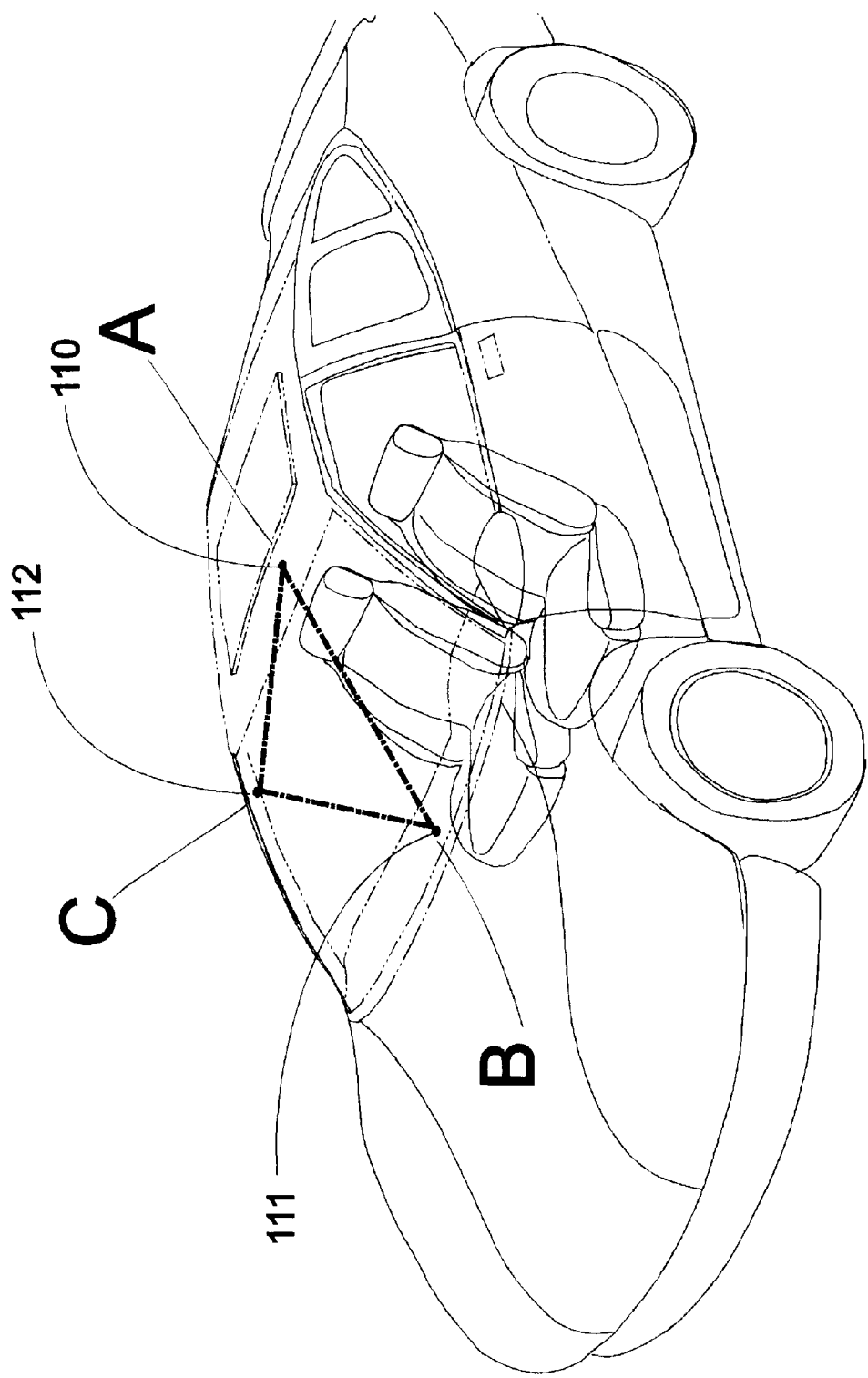
FIG. 7 illustrates a preferred mounting location of a three transducer system.
Figure 8:
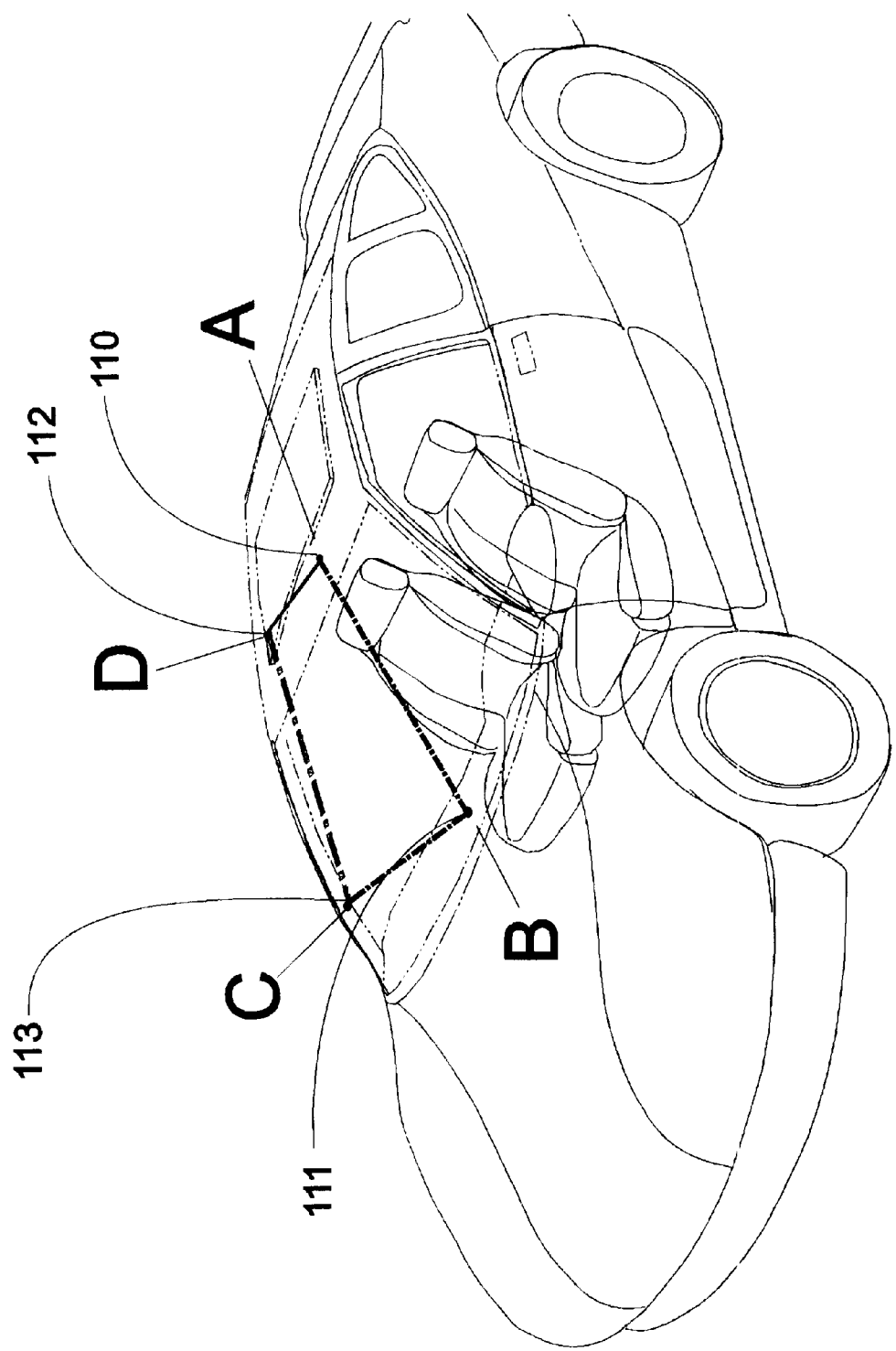
FIG. 8 illustrates a preferred mounting location of a four transducer system.

For those cases where it is not possible to achieve this isolation, a third transducer 112 can be used as shown in FIG. 7 which now provides a third set of spherical surfaces relative to the third transducer. Transducer 112 is positioned on the passenger side of the A-pillar (which is a preferred placement if the system is designed to operate on the passenger side of the vehicle). Three spherical surfaces now intersect in only two points thus substantially reducing the area of uncertainty. Finally, with the addition of a fourth transducer 113 as shown in FIG. 8, even greater accuracy is attained. Transducer 113 is positioned on the ceiling of the vehicle close to the passenger side door. In FIG. 8, lines connecting the transducers C and D and the transducers A and B are substantially parallel permitting an accurate determination of asymmetry and thereby object rotation. Thus, for example, if the infant seat is placed on an angle as shown in FIG. 4, this condition can be determined and taken into account when the decision is made to disable the deployment of the airbag.

The discussion above has centered on determining whether the two target volumes, that adjacent the airbag and that adjacent the upper portion of the vehicle seat, are occupied. Other systems have been described in the above referenced patents using a sensor mounted on or adjacent the airbag module and a sensor mounted high in the vehicle to monitor the space near the vehicle seat. Such systems use the sensors as independent devices and do not use the combination of the two sensors to determine where the object is located. In fact, the location of such sensors is usually poorly chosen so that it is easy blind either or both with a newspaper, for example. Furthermore, no system has heretofore been disclosed which uses more than two transducers in such a manner that one or more can be blocked without causing serious deterioration of the system. Again, the examples here have been for the purpose of suppressing the deployment of the airbag when it is necessary to prevent injury. The sensor system disclosed can be used for many other purposes such as disclosed in the above mention patent applications assigned to the same company as the instant invention. The ability to use the sensors for these other applications in generally lacking in the systems disclosed in the other referenced patents.

Figure 9:
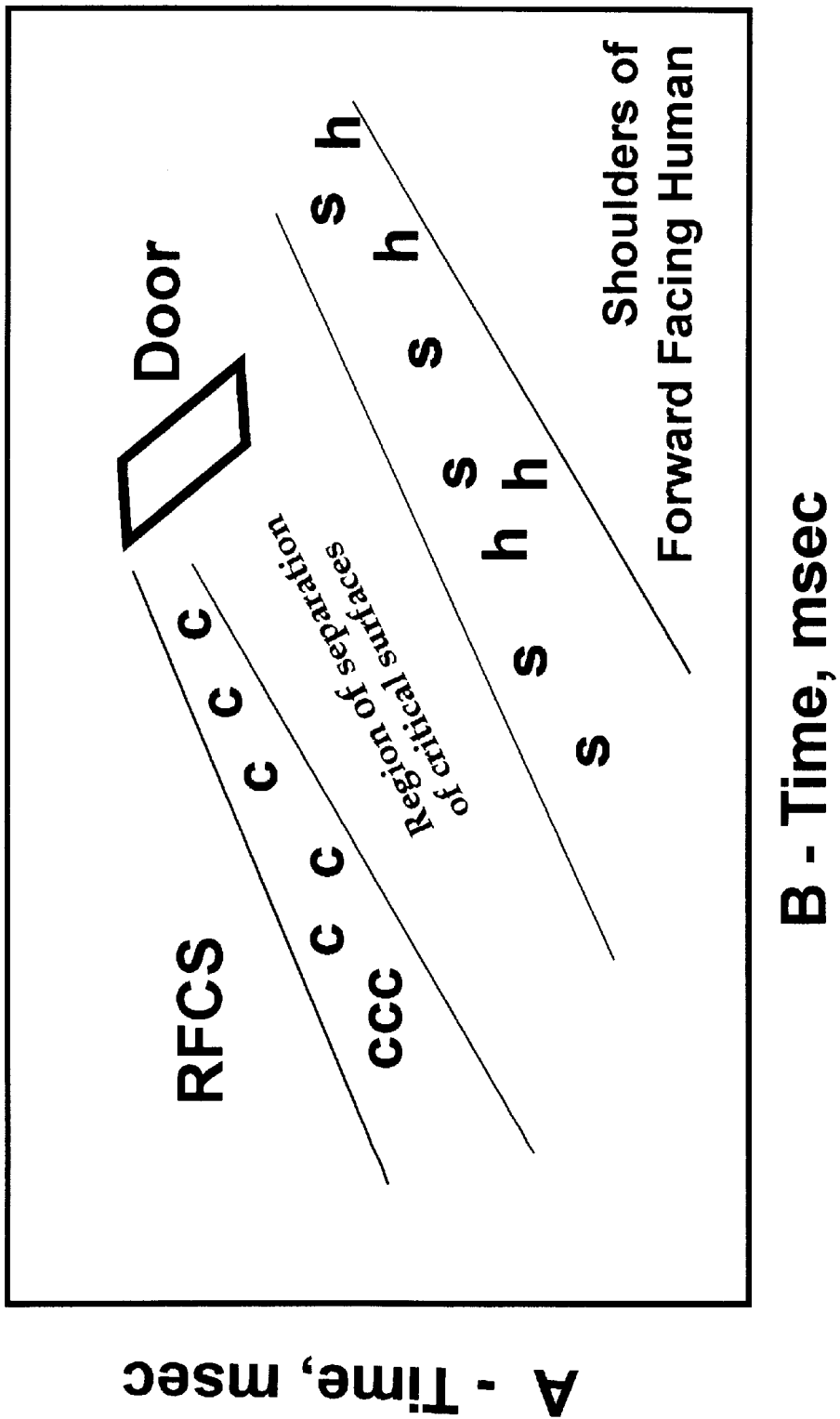
FIG. 9 is a plot showing the target volume discrimination for two transducers.

Considering once again the condition of FIGS. 1 through 6 where two transducers are used, a plot can be made showing the reflection times of the objects which are located in the region of curve E and curve F of FIG. 6. This plot is shown on FIG. 9 where the c's represent reflections from rear facing child seats from various tests where the seats were placed in a variety of different positions and similarly the s's and h's represent shoulders and heads respectively of various forward facing human occupants. Note that there is a region of separation between corridors that house the different object classes. It is this fact which is used in conjunction with neural networks, as described in the above referenced patent applications, which permit accurate discrimination of rear facing child seats from forward facing humans. Heretofore before the transducers were appropriately located to separate these two zones, the entire discrimination task was accomplished using neural networks. There was significant overlap between the reflections from the various objects and therefore separation was done based on patterns of the reflected waves. By carefully orienting the transducers so as to create this region of separation of the critical surfaces wherein all of the rear facing child seat data falls within a known corridor, the task remaining for the neural networks is substantially simplified with the result that the accuracy of identification is substantially improved.

Using two transducers as shown in FIGS. 1 through 6 an accuracy based on a matrix comprising in excess of 15,000 tests for the training set and 1000 tests for the test set yielded results of approximately 100% accuracy for the training set and about 90% to about 95% for the test set. When the third transducer was added, the accuracy on the test set increased to in excess of about 99% and with the fourth transducer the accuracy was measurably higher. An exact determination of the accuracy cannot be done without a significantly larger test series.

It is important to realize that these accuracies are based on a data set which assigns the same weight to a normally belted rear facing child seat as to one which is rotated about 45 degrees, is at the extreme forward position of the seat and where the seat back is down, for example. That is, the normal rear facing seat position which in reality represents the majority of cases represents only a single point in the test series while there are many extreme cases which may never actually occur which have the same weight in the test series. Thus the accuracy percentages quoted above are quite conservative and the actual accuracy taking into account actual passenger seat usage patterns is at least ten times higher.

Three general classes of child seats exist as well as several models which are unique. First there is the infant only seat as shown in FIG. 4 which is for occupants weighing up to about 20 pounds. This is supposed to be only placed in the rear facing position. The second which is illustrated in FIGS. 2 and 3 is for children from about 20 to about 40 pounds and can be used in both the forward and rear facing position and the third is for use only in the forward facing position and is for children weighing over about 40 pounds. All of these seats as well as the unique models were used as part of the 15,000 test set. For each child seat there are several hundred unique tests representing virtually every possible position of that seat within the vehicle. Tests are run, for example, with the seat tilted 22 degrees, rotated 17 degrees, placed on the front of the seat with the seat back fully up with the seat fully back and with the window open as well as all variations of there parameters.

A large number of cases is also run with various clothing, toys, bottles, blankets etc. added to the child seat in an attempt to defeat the system.

Similar variations are used for the occupants which include all sizes of occupant with all manner of clothing and reading maps or newspapers, leaning forward to adjust the radio, for example also included are cases where the occupant puts his/her feet onto the dashboard or otherwise assumes a wide variety of unusual positions. When all of the above configurations are considered along with many others not mentioned, the total number of configurations which are used to train the pattern recognition system can equal 500,000 or more. The goal is to include in the configuration training set representations of all cases which positions occur in actual use. Since the system is virtually 100% accurate in making the correct decision for cases which are similar to those in the training set, the total system accuracy increases as the size of the training set increases. To collect data for 500,000 vehicle configurations is not a formidable task. A trained technician crew can typically collect data on in excess of 2000 configurations per hour. It is important to note that it is not necessary to train on every vehicle produced but rather on each platform. A platform is an automobile manufacturer's designation of a group of vehicle models which are built on the same vehicle structure.

More detail on the operation of the transducers and control circuitry as well as the neural network is provided in the above referenced patent applications and is included herein as if the entire text of those patents were reproduced here. One particular example of a successful neural network for the two transducer case had 78 input nodes, 6 hidden nodes and one output node. The weights of the network were determined by supervised training as described in the referenced patent applications and in more detail in the references cited therein.

Finally, the system is trained and tested with situations representative of the manufacturing and installation tolerances which occur during the production and delivery of the vehicle as well as usage and deterioration effects. Thus, for example, the system is tested with the transducer mounting positions shifted by up to one inch in any direction and rotated by up to 15 degrees, with an accumulation of dirt and other variations. This tolerance to vehicle variation also permits the installation of the system onto a different model vehicle with, in many cases, only minimal retraining of the system.

The speed of sound varies with temperature, humidity, and pressure. This is compensated for by using the fact that the geometry between the transducers in known and the speed of sound can therefore be measured. Thus, on vehicle startup and as often as desired thereafter, the speed of sound is measured by one transducer, such as transducer 110 in FIG. 4, sending a signal which is directly received by another transducer and since the distance separating them is known, the speed of sound can be calculated and the system automatically adjusted to remove the variation due to the change in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

Another important feature of this invention is the realization that motion of the vehicle can be used in a novel manner to substantially increase the accuracy of the system. Ultrasonic waves reflect on most objects as light off a mirror. This is due to the relatively long wave length of ultrasound as compared with light. As a result, certain reflections can overwhelm the receiver and reduce the available information. When readings are taken while the vehicle is in motion, and these readings averaged over several transmission/reception cycles, the motion of the vehicle causes various surfaces to change their angular orientation slightly but enough to change the reflective pattern and reduce this mirror effect. The net effect is that the average of several cycles gives a much clearer image of the reflecting object than is obtainable from a single cycle. This then provides a better image to the neural network and significantly improves the identification accuracy of the system.

Although most of the above discussion has been centered around the rear facing child/human occupant discrimination problem, this same methodology permits a better determination of the out-of-position occupant. Since it is now possible to accurately discriminate between the head and shoulders and other objects, the displacement of the head and shoulders, as well as their initial position, can be accurately monitored and if they get too close to the airbag prior to deployment, the deployment can be suppressed. This can of course be done for both the driver and passenger and for all other vehicle occupants.

Thus, to reiterate the more novel features of the invention, this application discloses (1) the application of two-sensor pairs to single-axis monitoring of target volumes; (2) the use of two-sensor sites spanning a target volume to sense object positions (spanning means that the sites extend beyond the objects along the axis sensing object positions between the sites); (3) the orientation of sensor axis for optimal target discrimination parallel to the axis of separation of distinguishing target features; (4) the definition of head and shoulders and supporting surfaces as defining humans for rear facing child seat detection and forward facing human detection; (5) the adjusting echo pattern sample delay and interval to correspond to critical spatial target locations; (6) the normalization of signals to eliminate calibration drift and variation effects; (7) the correction of echo sample delay and interval times by cross-checks of sensors; (8) an out-of-position occupant sensing with same system; (9) the provision for recording seat occupant position at time of crash; (10) the improvement of system reliability by comparing successive series of decisions (to enable/disable the airbag); (11) multi-shot signal to noise ratio enhancement; and (12) the update of decision every 1 to 10 seconds.

Significant aspects of the invention are thus as follows:

1) Ultrasonic transducers are used singly to send and receive ultrasonic waves for object and occupant detection in automotive seats.

2) Ultrasonic transducers are used in pairs as sender and receiver at a common location to send and receive ultrasonic waves with respect to an automotive passenger seat.

3) Ultrasonic transducers are used singly or in pairs to send and receive ultrasonic waves at two locations relative to an automotive seat position thus defining a sensing axis defined as the line extending between the transducers and allowing reflective surfaces to be located in two dimensions relative to that axis.

4) Transducers at the end points of the axis defined by their positions locate objects in two dimensions as being on circles centered on the axis and the radius of the circle.

5) Cylindrical coordinates resulting from geometry described in 4) locate objects to lie on the circles of the two-dimensional coordinate system.

6) Two objects lying in a volume sensed by the above transducers are distinguishable if they lie on separate and distinct circles of the coordinate system.

7) The coordinate system is constructed to have unique and separate coordinate circles pass through the locations of objects requiring distinct identification.

8) Transducers lying at the end points of an axis defined by their position in an automotive interior locate objects in two dimensions as the flight time of ultrasonic waves to the objects and their reflections back to the transducers.

9) Ultrasonic transducers may be used in the above geometries as a sender receiver at each end of the referent coordinate axis.

10) The direct measure of the location of an object in the sensing volume of the two transducers is the 'time of flight' of an ultrasonic pulse.

11) The time of flight converts to the geometric coordinate of 8) by means of the speed of sound: $Xi=Cs*Ti$.

12) The Cylindrical and Linear coordinate systems correlate and mutually transform.

13) To locate distinct objects, the transducers are positioned to define an axis which is placed to be parallel to the separation axis of the objects to be distinguished. Two separate circles of the cylindrical coordinate system uniquely intercept and locate the two objects. The echo flight times for each transducer-object pair are the practical measures of the system.

14) The aforementioned ultrasonic system is used to detect a Rear-Facing Child Seat (RFCS) in the passenger seat of an automotive vehicle.

15) The RFCS is distinguished from a Forward-Facing Human by virtue of the head and shoulder volumes and their reflecting surfaces and/or any support-protective surfaces around them.

16) Two transducers placed with their separation axis parallel to the separation axis of the head and shoulder volumes of occupants of an automotive passenger seat are capable of distinguishing the different configurations.

17) The echo times are the measurable coordinates of choice for distinguishing the object configurations.

18) A target volume is monitored by sending and receiving ultrasonic pulses to be reflected from targets in the sensed volume, the reflected pulse train being the 2-dimensional signature of surfaces in the target volume.

19) The correspondence of echo times to geometric location of critical, object-defining surfaces within the target volume means the echo pattern contains identifying information regarding the occupancy of the sensed target volume.

20) Pattern recognition techniques disclosed in prior applications employing neural networks are used in a novel manner to correlate the echo patterns with various conditions of seat occupancy.

21) Specific ranges of volume are monitored for critical Child Seat information by limiting echo pattern analysis to time windows corresponding to critical surfaces.

22) Echo signals are normalized to remove effects of sensor calibration including drift.

23) Speed of sound varies with atmospheric temperature, pressure and humidity. The changes affect the time-segmentation of echo pattern data into correct, corresponding geometric coordinate sample spaces. Speed of sound is correctly measured by the measurement of direct time of flight of an echo pulse between a pair of transducers at a known separation and is used to correct the segmentation of the echo pattern. Standard temperature and pressure (STP) is the normal reference point for the system.

24) The time delays and any echo pattern sample times are adjusted to STP conditions.

25) The communication of one transducer with another allows a diagnostic of transducer function and calibration.

26) The above described-system can be trained to 'recognize' Out-of-Position occupants.

27) The above-described system can provide a record of pre-impact occupant position to the crash-recording black box allowing post-crash position analysis.

28) The system can update every 1 or more seconds or more frequently if desired.

29) A time-record of measured seat occupancy, i.e., repeated shots over time, can be summed, averaged or compared to provide more reliable decisions.

30) Decisions confirmed by repeated position measurement are not changed by just one unexpected change, but are used as part of the time-averaged decision process further increasing the accuracy of the decision system.

31) Many shots at one 'moment' in time are averaged to improve signal-to-noise ratios.

32) Motion of the vehicle is desirable to average out certain echo patterns removing ultrasonic interference patterns. This fact is used to further improve system accuracy.

33) The Rear Facing Child Seat Detector (RFCSD) system is transferable from one vehicle model to another with minimum retraining when the transducer geometry is referenced to the passenger seat geometry.

34) The RFCSD system can be based on triangulation with three transducers for improved reliability by means of triangulation.

35) The RFCSD system can be based on four transducers for redundancy of information and allowing for soft failure of the system—by means of two parallel axes spanning the target volume on each of two sides.

The methods above have been described in connection with the use of ultrasonic transducers. Many of the methods, however, are also applicable to optical, radar and other sensing systems and where applicable, this invention is not limited to ultrasonic systems. In particular, an important feature of this invention is the use of three or more separately located receivers such that the system still operates with high reliability if one of the receivers is blocked by some object such as a newspaper. This feature is also applicable to systems using electromagnetic radiation instead of ultrasonic. With the use of electromagnetic radiation and the advances which have recently been made in the field of very low light level sensitivity, it is now possible in some implementations to eliminate the transmitters and use background light as the source of illumination along with using a technique such as auto-focusing to obtain the distance from the receiver to the object. Thus, only receivers would be required further reducing the complexity of the system.

In the preferred embodiments described herein, each transducer mounting location contains a single transmitter and receiver pair or a device which functions both as a transmitter and a receiver. In each case, the data entered into the pattern recognition algorithm (in other words the data from which the pattern algorithm was generated) was data obtained by receivers receiving reflections from objects of waves sent by only the transmitters associated with the respective receivers. Although this is the preferred arrangement, a similar system can be designed based on reflections from waves emitted from other transmitters which are not co-located with the respective receivers.

Although implicit in the above discussion, an important feature of this invention which should be emphasized is the distributed nature of the transducer mountings. Other systems which have attempted to solve the RFCS and out-of-position problems have relied on a single or at most two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If four transducers are used as illustrated in the distributed system of FIG. 8, for example, the system suffers only a slight reduction in accuracy even if two of the transducers are covered so as to make them inoperable.

Although several preferred embodiments are illustrated and described above, there are other possible combinations using different sensors located at different positions within the automobile passenger compartment which measure either the same or different characteristics of an occupying object to accomplish the same or similar goals as those described herein. There are also numerous additional applications in addition to those described above including, but not limited to, monitoring the driver seat, the center seat or the rear seat of the vehicle or for controlling other vehicle systems in addition to the airbag system. This invention is not limited to the above embodiments and should be determined by the following claims.

We claim:

1. A method for determining the location of an object in a passenger compartment of a vehicle, comprising the steps of:

arranging a first ultrasonic transducer on a ceiling of the vehicle and a second ultrasonic transducer at a different location in the vehicle such that a first axis connecting the first and second transducers is substantially parallel to a second axis traversing a volume in the passenger compartment above a seat in which the object is situated, transmitting ultrasonic waves from the first transducer into the passenger compartment;

receiving ultrasonic waves reflected off an object in the passenger compartment by means of the first transducer;

calculating a first distance from the first transducer to the object based on the time difference between the transmitted waves and reflected waves when received by the first transducer;

transmitting different ultrasonic waves from the second transducer into the passenger compartment;

receiving ultrasonic waves reflected off the object in the passenger compartment by means of the second transducer;

calculating a second distance from the second transducer to the object based on the time difference between the transmitted waves and reflected waves when received by the second transducer; and determining an approximate location of the object in the passenger compartment based on the first distance and the second distance.

2. The method of claim 1, further comprising the steps of:

transmitting different ultrasonic waves from a third ultrasonic transducer into the passenger compartment;

receiving ultrasonic waves reflected off the object in the passenger compartment by means of the third transducer;

calculating a third distance from the third transducer to the object based on the time difference between the transmitted waves and reflected waves when received by the third transducer; and determining the approximate location of the object in the passenger compartment based on the first distance, the second distance and the third distance.

3. The method of claim 2, further comprising the steps of:

transmitting different ultrasonic waves from a fourth ultrasonic transducer into the passenger compartment;

receiving ultrasonic waves reflected off the object in the passenger compartment by means of the fourth transducer;

calculating a fourth distance from the fourth transducer to the object based on the time difference between the transmitted waves and reflected waves when received by the fourth transducer; and determining the approximate location of the object in the passenger compartment based on the first distance, the second distance, the third distance and the fourth distance.

4. The method of claim 1 wherein said first and second distance calculation steps each comprise the step of using waves reflected from multiple locations on the object.

5. The method of claim 4, wherein said first and second distance calculation steps each further comprises the step of employing pattern recognition techniques based on the time distribution of the echo pattern of the reflected waves.

6. The method of claim 5, wherein said step of employing pattern recognition techniques comprises the step of generating an algorithm by means of a neural network computer program.

7. The method of claim 1, further comprising the steps of:
identifying a first volume within the passenger compartment adjacent the airbag where occupancy by a human at the time of airbag deployment would place the human in danger;
identifying a second volume within the passenger compartment where occupancy by a human requires deployment of an airbag in a sufficiently severe vehicle crash; and
defining the second axis as the axis connecting the centers of the first and second volumes.

8. The method of claim 1, further comprising the step of:
positioning the second transducer on a dashboard of the vehicle.

9. The method of claim 2, further comprising the steps of:
positioning the second transducer on a dashboard of the vehicle, and
positioning the third transducer on or adjacent an interior side surface of said passenger compartment.

10. The method of claim 3, further comprising the steps of:
positioning the second transducer on a dashboard of the vehicle,
positioning the third transducer on an interior side surface of said passenger compartment, and
positioning the fourth transducer on or adjacent an interior side surface of said passenger compartment.

11. A method for identifying an object in a passenger compartment, comprising the steps of:
mounting at least first and second ultrasonic transducers at different locations in the passenger compartment;
conducting training identification tests on a plurality of different classes of objects when situated in the passenger compartment, each of said tests comprising the steps of transmitting ultrasonic waves from the first transducer into the passenger compartment, receiving waves reflected off the object by means of the first transducer, transmitting different ultrasonic waves from the second transducer into the passenger compartment, receiving waves reflected off the object by means of the second transducer, and associating an object class with data from each test,
generating a pattern recognition algorithm from the training test results and associated object classes such that the algorithm is able to process information from the reflected waves from the first and second transducers and provide the identification of the class of the object;
transmitting ultrasonic waves from the first transducer into the passenger compartment when identification of an object in the passenger compartment is desired;
receiving waves reflected off the object by means of the first transducer;
transmitting different ultrasonic waves from the second transducer into the passenger compartment when identification of the object in the passenger compartment is desired;
receiving waves reflected off the object by means of the second transducer; and
applying the algorithm based on the first and second reflected waves to identify the object in the passenger compartment.

12. The method of claim 11, wherein said object class is a child seat in the rear facing position.

13. The method of claim 11, wherein said object class is an out-of-position occupant.

14. The method of claim 11, further comprising the step of normalizing the reflected waves.

15. The method of claim 11, further comprising the step of performing a system diagnosis by transmitting waves from the first transducer to the second transducer.

16. The method of claim 11, further comprising the step of recording the reflected waves for subsequent analysis of a vehicle event.

17. The method of claim 11, further comprising the step of providing an output from the system to control another vehicle system based on the identification results.

18. The method of claim 11, further comprising the step of combining at least two sets of reflected waves prior to their use in identifying an object.

19. The method of claim 17, further comprising the step of comparing at least two identification cycles before the output is provided to the another vehicle system.

20. The method of claim 11, further comprising the step of compensating for changes in the speed of sound.

21. The method of claim 11, further comprising the step of:
selecting the different classes of objects to be rear facing child seats, forward facing child set, adult passengers and infant passengers.

22. The method of claim 11, further comprising the steps of:
positioning the first transducer on a ceiling of the vehicle, and
positioning the second transducer on a dashboard of the vehicle.

23. A method for determining the location of an object in a passenger compartment of a vehicle, comprising the steps of:
arranging a first receiver on a ceiling of the vehicle and a second receiver at a different location in the vehicle such that a first axis connecting the first and second receivers is substantially parallel to a second axis traversing a volume in the passenger comment above a seat in which the object is situated;
mounting a third receiver at a different location in the passenger compartment than the first and second receiver each receiver comprising distance measurement means;
calculating a first distance from the first receiver to the object based on the output of the first receiver;
calculating a second distance from the second receiver to the object based on the output of the second receiver;
calculating a third distance from the third receiver to the object based on the output of the third receiver; and
determining an approximate location of the object in the passenger compartment based on the first distance, the second distance and the third distance.

24. The method of claim 23, wherein said receivers are arranged to receive ultrasonic radiation.

25. The method of claim 23, wherein said receivers are arranged to receive electromagnetic radiation.

26. The method of claim 23, further comprising the steps of:
mounting a fourth receiver at a different location in the passenger compartment, the fourth receiver comprising distance measurement means,
calculating a fourth distance from the fourth receiver to the object based on the output of the fourth receiver,
determining an approximate location of the object in the passenger compartment based on the first distance, the second distance, the third distance and the fourth distance.

27. The method of claim 23, wherein the first, second and third receivers are of the same type.

28. A method for determining the location of an object in a passenger compartment of a vehicle, comprising the steps of:

transmitting ultrasonic waves from a first transducer into the passenger compartment;

receiving waves reflected off an object in the passenger compartment by means of the first transducer;

calculating a first distance from the first transducer to the object based on the time difference between the transmitted waves and reflected waves when received by the first transducer;

transmitting different ultrasonic waves from a second transducer into the passenger compartment;

receiving waves reflected off the object in the passenger compartment by means of the second transducer;

calculating a second distance from the second transducer to the object based on the time difference between the transmitted waves and reflected waves when received by the second transducer; and determining an approximate location of the object in the passenger compartment based on the first distance and the second distance;

said first and second distance calculation steps comprising the step of applying an algorithm generated by means of a neural network computer program based on the time distribution of the echo pattern of the reflected waves in order to determine the distance from the respective transducer to the object.

\* \* \* \* \*